(12) United States Patent
Richmann et al.

(10) Patent No.: US 7,895,112 B2
(45) Date of Patent: Feb. 22, 2011

(54) ORDER BOOK PROCESS AND METHOD

(75) Inventors: James N. Richmann, Lewes, DE (US);
Stuart Serkin, Fairfield, CT (US);
Timothy Vincent, Shelton, CT (US);
Fred Stiening, Derby, CT (US); John T. Hughes, Jr., Stratford, CT (US); Daniel F. Moore, New Haven, CT (US)

(73) Assignee: The NASDAQ OMX Group, Inc., Rockville, MD (US)

(*) Notice: Subject to any disclaimer, the term of this patent is extended or adjusted under 35 U.S.C. 154(b) by 1128 days.

(21) Appl. No.: 10/206,316

(22) Filed: Jul. 25, 2002
(Under 37 CFR 1.47)

(65) Prior Publication Data
US 2003/0229557 A1 Dec. 11, 2003

Related U.S. Application Data

(60) Provisional application No. 60/385,988, filed on Jun. 5, 2002, provisional application No. 60/385,979, filed on Jun. 5, 2002.

(51) Int. Cl.
*G06Q 40/00* (2006.01)

(52) U.S. Cl. .......................................................... 705/37

(58) Field of Classification Search ................. 705/30, 705/33, 35, 37; 710/26–51, 200, 244; 709/212–229; 707/999
See application file for complete search history.

(56) References Cited

U.S. PATENT DOCUMENTS

| | | | |
|---|---|---|---|
| 4,809,168 A * | 2/1989 | Hennessy et al. | 718/104 |
| 5,077,665 A * | 12/1991 | Silverman et al. | 705/37 |
| 5,101,353 A | 3/1992 | Lupien et al. | |
| 5,297,031 A * | 3/1994 | Gutterman et al. | 705/37 |
| 5,440,749 A * | 8/1995 | Moore et al. | 712/206 |
| 5,774,879 A | 6/1998 | Custy et al. | |
| 5,812,988 A | 9/1998 | Sandretto | |
| 5,827,071 A * | 10/1998 | Sorensen et al. | 434/323 |
| 5,924,083 A * | 7/1999 | Silverman et al. | 705/37 |
| 6,014,643 A | 1/2000 | Minton | |
| 6,035,287 A | 3/2000 | Stallaert et al. | |
| 6,157,914 A | 12/2000 | Seto et al. | |
| 6,202,125 B1 * | 3/2001 | Patterson et al. | 711/118 |
| 6,247,000 B1 | 6/2001 | Hawkins et al. | |
| 6,278,982 B1 * | 8/2001 | Korhammer et al. | 705/36 R |
| 6,317,726 B1 | 11/2001 | O'Shaughnessy | |
| 6,317,728 B1 | 11/2001 | Kane | |
| 6,442,533 B1 | 8/2002 | Hinkle | |
| 6,505,174 B1 | 1/2003 | Keiser et al. | |
| 6,601,044 B1 | 7/2003 | Wallman | |
| 6,708,166 B1 * | 3/2004 | Dysart et al. | 707/6 |
| 7,082,133 B1 | 7/2006 | Lor et al. | |

(Continued)

OTHER PUBLICATIONS

What is Main Memory? From http://www.webopedia.com/TERM/M/main_memory.html.

(Continued)

*Primary Examiner*—Mary Cheung
(74) *Attorney, Agent, or Firm*—Fish & Richardson P.C.

(57) ABSTRACT

A system for execution of transactions includes a main memory of a computer system storing an order book to match a portion of security interest in the order book to a received order for a security.

32 Claims, 3 Drawing Sheets

U.S. PATENT DOCUMENTS

| | | |
|---|---|---|
| 7,110,975 B2 | 9/2006 | Marks de Chabris et al. |
| 7,167,844 B1 | 1/2007 | Leong et al. |
| 7,181,424 B1 | 2/2007 | Ketchum et al. |
| 7,184,441 B1 | 2/2007 | Kadambi et al. |
| 7,246,092 B1 | 7/2007 | Peterson et al. |
| 7,318,045 B2 | 1/2008 | Baecker et al. |
| 7,496,533 B1 | 2/2009 | Keith |
| 2001/0034686 A1 | 10/2001 | Eder |
| 2002/0099647 A1 | 7/2002 | Howorka et al. |
| 2002/0138401 A1 | 9/2002 | Allen et al. |
| 2002/0156716 A1 | 10/2002 | Adatia |
| 2002/0198820 A1 | 12/2002 | Mills |
| 2003/0009413 A1 | 1/2003 | Furbush et al. |
| 2003/0083973 A1 | 5/2003 | Horsfall |
| 2003/0140027 A1 | 7/2003 | Huttel et al. |
| 2003/0225671 A1 | 12/2003 | Miller et al. |
| 2003/0225672 A1 | 12/2003 | Hughes, Jr. et al. |
| 2003/0225673 A1 | 12/2003 | Hughes, Jr. et al. |
| 2003/0225674 A1 | 12/2003 | Hughes, Jr. et al. |
| 2003/0229557 A1 | 12/2003 | Richmann et al. |
| 2003/0229566 A1 | 12/2003 | Moore et al. |
| 2003/0229567 A1 | 12/2003 | Serkin et al. |
| 2003/0229568 A1 | 12/2003 | Richmann et al. |
| 2004/0034591 A1 | 2/2004 | Waelbroeck et al. |
| 2004/0143542 A1* | 7/2004 | Magill et al. .................. 705/37 |

OTHER PUBLICATIONS

Computer Data Storage from http://en.wikipedia.org/wiki/compter_storage.

RAM: A Brief Introduction from http://www.linfo.org/ram.html.

John Wiley & Sons Ltd, Dictionary of Multimedia and Internet Applications: A Guide for Developers and Users, 1999, retrieved by xreferplus.com.

Latest office action from 2003/0225672.

Latest office action from 2003/0225673.

Latest office action from 2003/0225674.

Latest office action from 2003/0229566.

Latest office action from 2003/0229568.

Facing A new reality: The SIA Conference addresses changing technology needs in a changing world. Editorial Staff. Traders Magazine. New York: Jun. 1, 2002. p. 1.

* cited by examiner

ORDER BOOK PROCESS AND METHOD

RELATED APPLICATIONS

This application claims the priority of U.S. Provisional Patent Application No. 60/385,988, entitled "Security Processor", and filed on Jun. 5, 2002 and to U.S. Provisional Patent Application No. 60/385,979, entitled "Supermontage Architecture", and filed on Jun. 5, 2002.

BACKGROUND

This invention relates to electronic securities trading, and the processing and displaying of information relating to electronic securities trading.

Electronic equity markets, such as The Nasdaq Stock Market™ collect, aggregate, and display pre-trade information to market makers. In The Nasdaq Stock Market™, for example, this pre-trade information can take the form of a quote that represents a single or an aggregate of same-priced principal or agency orders. A market, such as The Nasdaq Stock Market™ also provides trading platforms through which market participants may trade securities in the marketplace.

SUMMARY

According to an aspect of this invention, a system for execution of transactions includes a main memory of a computer system storing an order book to match a portion of security interest in the order book to a received order for a security.

According to a further aspect of the invention, a method includes storing an order book representing trading interest of at least one security traded on an electronic market in a main memory of a computer system, and matching a portion of the security trading interest in the order book to a received order for a security represented in the book.

According to a further aspect of the invention, a computer program product residing on a computer readable medium includes instructions for trading securities in an electronic market to cause a computer to store an order book representing trading interest of at least one security in a main memory of a computer system, and to match a portion of the security trading interest in the order book to a received order for a security represented in the book.

One or more of the following features may also be included.

The main memory may be random access memory. The main memory may be a cache. The security interest residing in the order book is exclusively accessible by a matching process. The order book resides in a first execution space of the main memory that includes a matching process. The order book resides in an execution space of the main memory separate from an execution space that includes a matching process. The order book has interest of a single security. The order book has interest of at least two securities. The received order is added to the order book if the received order is not immediately executed. The received order is added to the order book if the received order is not immediately canceled.

One or more advantages can be provided from the above. By storing, for example, received orders, quotes, or other security information in an order book residing in random access memory, processing time decreases while throughput substantially increases. Further, since the random access memory resident order book is exclusively accessible by a matching process, other processes may only gain access to the order book by passing through this matching process gateway. Thus, the order book is isolated from non-matching related functions, such as scanning the security information stored in the order book which may delay matching a received order to an order stored on the order book. Additionally, due to the relatively fast access time of random access memory, the order book may be quickly rebuilt after, for example, a system malfunction. By providing faster access times to securities information stored on the random access memory resident order book, a user is also better able to conduct securities trading.

DETAILED DESCRIPTION

Figure 1:
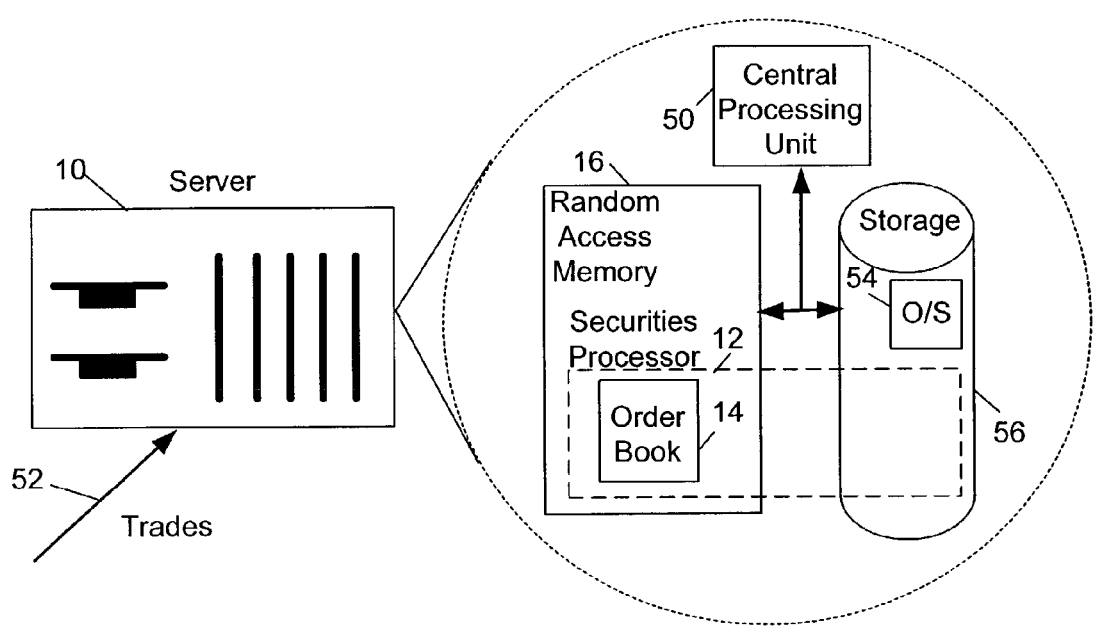
FIG. 1 is a block diagram of a server.

Referring to FIG. 1, a server 10 is shown that includes a securities processor 12 that contains an order book 14 that resides in random access memory 16 and stores securities trade information. The securities processor 12 is one portion of a computerized trading system, which trades securities electronically by processing one-sided or two-sided transactions entered by a user (e.g., a market participant). Users typically access and use the computerized trading system via a computer, thus allowing the users to enter security trades themselves or through professional traders/brokers. A central processing unit (CPU) 50 processes the trades, received over network 52, by executing instructions stored in an operating system (O/S) 54, along with other instructions, which are stored in server storage 56. In some implementations, the server storage 56 may be hard disk drive, a tape drive, an optical drive, a redundant array of independent disks (RAID), or other similar sequential access storage device or devices that provides a persistent store of the recorded information. Typically, server 10 is a multi-processing, fault-tolerant system that includes multiple central processing units that each have a dedicated main memory system, in this implementation random access memory 16, or share a common main memory pool. While being executed by the central processing unit(s) of server 10, multiple instantiations of securities processor 12 may reside in the main memory system of server 10. Further, the processes and subroutines of securities processor 12 may also be present in various levels of cache memory incorporated into server 10.

Figure 2:
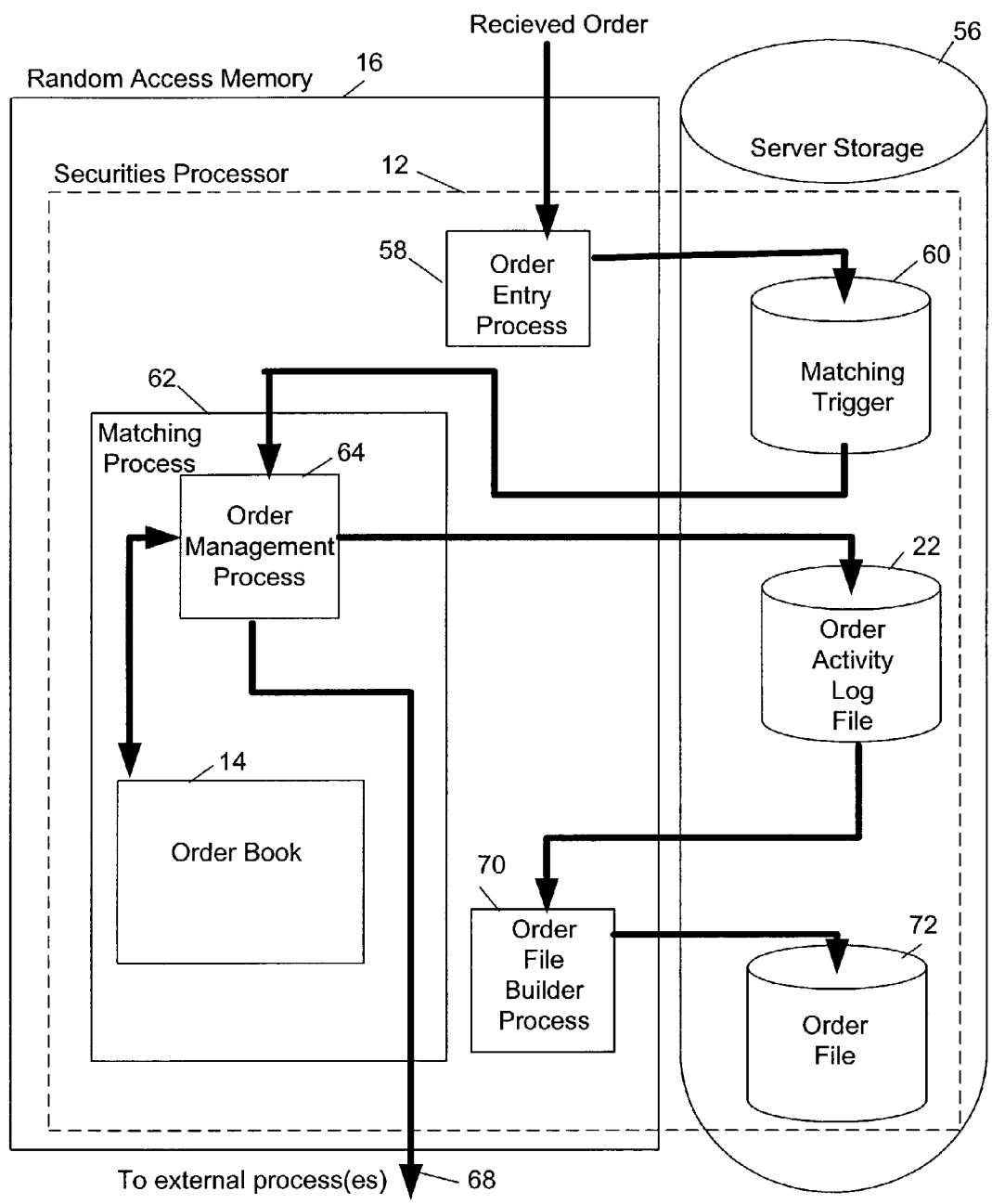
FIG. 2 is a block diagram of a random access memory and a server storage.

Referring to FIG. 2, the securities processor 12 that includes a portion of the server storage 56 and the random access memory 16 is shown. For example, to perform a trade for a particular security, a user enters an order into the computerized trading system that is received and directed to the securities processor 12 assigned to the particular security. In some implementations, the securities processor 12 may be assigned to two or more securities in order to distribute the volume of securities trading over a number of other securities processors (not shown). In other implementations, the securities processor 12 may be assigned to one heavily traded, high volume security to reduce trading volume of that security on other securities processors.

The securities processor 12 may be assigned to one particular security and store related security trading interest in the order book 14 residing in the random access memory 16 of that securities processor 12. By random access memory is meant main memory or alternatively one or more levels of cache memory. In some implementations a matching process may load portions of the order book into a level of cache memory from the main memory. Alternatively, the securities processor 12 may be assigned to multiple securities and correspondingly, the order book 14 residing in random access memory 16 of that securities processor stores the trading interests of those multiple securities. In some implementations, to store interests for multiple securities, the order book 14 in random access memory 16 may be partitioned into multiple sections, dimensions, or files to store the interests assigned to the securities processor 12. Here the order book 14 resides within the execution space of the random access memory 16 that has the matching process 62. However, in some implementations the order book 14 resides in an execution space of the random access memory 16 that is separate from another execution space having the matching process 62. Also, the order book 14 is exclusively accessible by the matching process 62 regardless whether or not both reside in the same execution space of the random access memory 16.

In addition to the support for a horizontally scalable architecture, the in memory order book 14 provides for reliable transaction processing at extremely high rates for an individual security. The internal state of the securities processor 12 is adjusted by processing incoming transactions in strict first-in, first-out serial sequence. The transaction rates capable for this approach exceeds those rates provided by traditional file based approaches and provide a reliable approach to use the order book 14 in random access memory 16 to hold the state of the book. By inserting, updating, and retrieving elements (records) from the in-memory order book 14 instead of a disk file, throughput substantially increases. Also, logic for allocating and freeing memory, maintaining lists and index tables associated with the in-memory order book 14 may be encapsulated random access memory 16.

In general, an order directed to the securities processor 12 is received by an order entry process 58 that performs cursory checking functions (e.g., order eligibility, order syntax, etc.) on the received order. If the received order fails one or more of the cursory functions the order is returned to the user, however, if the cursory functions are passed, the received order is logged in to a matching trigger 60. The matching trigger 60 queues the received order along with, for example, other orders, quotes, deliveries, or supervisory commands that are received by the securities processor 12 for the security or securities assigned to the securities processor. Typically the received order represents a new order for processing (e.g., match against open orders, add as new open orders, etc.) while the supervisory commands, for example, cancel, modify, or execute other similar actions against existing orders stored in the order book 14 residing in random access memory 16.

Once queued into the matching trigger 60, the received order is held in the matching trigger until pulled into a matching process 62 by an order management process 64. The matching process 62 matches portions of the received order, i.e., executes and allocates the received orders and stores the unmatched portion of the order stored in the order book 14. After pulling the received order, which is at least partially marketable and has cleared initial validations, the matching process 62 attempts to execute all or part of the received order with one or more orders on the contra side of the order book 14. Upon pulling the received order, the matching process 62 checks and validates the received order (e.g., marketability check, apply short sale rule, etc.) with definite and unambiguous knowledge of the current state of the market for the particular security. In some implementations, the validations are specific to orders received while some validations are specific for quotes received by the securities processor 12 or the validations may be common to quotes and orders. In this particular example the securities processor 12 received an order and if the check or validation fails the received order is returned to the user unexecuted.

One factor that is considered by the matching process 62 is the quantity of the received order because matching the received order continues until the entire received, marketable order is exhausted. In executing the received order to the fullest extent, a display size of the received order, as well as a reserve size, if any, are combined and the matching process 62 continues to execute this combined quantity of the received order against contra side orders stored in the order book 14 until exhaustion of the received order. To match against orders stored in the order book 14, the stored orders have an open status and are on the opposite side of the market to that of the received order. Once the received order is completely exhausted, the matching process 62 is complete and the execution is reported to other processes internal and external to the securities processor 12.

Another factor concerning the matching process 62 is the marketability of the received order. After passing the previous validations during the order entry process 58, the matching process 62 determines whether the received order is marketable. The received order is marketable if the order is a limit or other type of priced order and the received order's price locks or crosses the inside for the particular security. For a received order which is a bid, the inside is locked or crossed if the bid price is higher than the current best (i.e., lowest) ask price; alternatively, for a received order which is an ask order, the inside is locked or crossed if the ask order price is lower than the current best (i.e., highest) bid price. The received order can also be marketable if it is a market type order.

Subsequently, if the order is marketable, further validations are performed using current inside market prior to retrieving an order stored in the order book 14 to match against. However, if after the received order, or a portion of the received order, is determined marketable and subsequently matched against a security interest retrieved from the order book 14, the inside spread changes which may result in the price of the received order not locking or crossing the market that occurrence could end the matching process 62. Also, if the received order, or a portion of the received order, is not marketable or not fully executable, the remainder is added to the order book 14 for matching to a future order received by the securities processor 12.

After the received order is determined marketable and subsequent validations based on current inside market are passed, the order management process 64 searches the contra-side orders stored in the order book 14 that correspond to the particular security of the received order. To search the orders stored in the order book 14, the order management process 64 may use parameters associated with the received order. In some implementations, one parameter associated with the received order is a market participant ID that may be passed to the order management process 64 as a search parameter. By searching with the market participant ID, internalization, preferenced orders, or regular matching may be performed by the order management process 64. A matching preference may also be associated with the received order. For example, the received order may specify a matching condition that causes the matching algorithm to match based on a price/time priority, a price/fee/time priority, a price/size priority, or other preference. Also, the order management process 64 checks that a retrieved order from the order book 14 is available for matching (e.g., it is not in outage, etc.).

To initiate matching the received order, the matching process 62 determines the total quantities that can be executed in the current matching cycle. The quantities are, for example, the total executable display quantity for market participants non-unlisted trading privileges (non-UTPs), the total executable reserve quantity for non-UTPs, and the total executable UTP quantity. The UTP quantity is segregated in some embodiments because the UTPs are allocated against only after all the display quantities and reserve quantities for non-UTPs at a particular price level are exhausted. These quantities are used to determine how much quantity from the display and reserve size of a retrieved order may be used in a match and whether a retrieved UTP order can be filled. Once the total executable quantities are defined, the orders for allocation are retrieved from the order book 14 in accordance with the appropriate prioritization algorithm and the use of internalization.

The order management process 64 retrieves the next order from the order book 14 and determines if the retrieved order meets the execution preference and requirements of the current match. For example, if a received order is specified with a prioritization preference of price/fee/time priority, and the order management process 64 retrieves an order from the order book 14 with fees, then this retrieved order is skipped. The order management process 64 continues to search the order book 14 for orders at a price level until an order that does not have access fees is found. If the order of this type is not found, the order management process 64 starts over and retrieves orders from the order book 14 that charge fees. After all orders residing in the order book 14, at a price level that meet the specified requirements for the match are exhausted, the matching cycle continues at the next price level provided the market is still crossed.

To execute a match between the received order and the order retrieved from the order book 14, the order management process 64 determines if the match, for example, is an automatic execution, an odd lot, or a delivery and assigns the appropriate execution type to the execution. After matching the received order, the order management process 64 updates the retrieved order in the order book 14. For example, the retrieved order may be completely exhausted and updated as 'executed' or, in another example, the retrieved order may have been partially executed and the remainder of the order is stored in the order book 14 with an open status. Also, during the matching of the received order, as the displayed size is exhausted, orders can be replenished from the reserve size. As portions of the received orders are matched by orders on the order book 14, the order management process 64 updates the order book 14 to reflect the matches. The order management process 64 also checks if the received order should be refreshed. If the order is refreshed and the market is still crossed, the order management process 64 continues matching. Otherwise, the order management process 64 completes by reporting the portion executed to other processes included in the securities processor 10 and external 68 to the securities processor.

In some implementations matching process 62 includes a looping function that is triggered when the received order is identified as being executable. The matching process 62 attempts to match a portion of the received order and continues matching the received order as long as the received quantity is greater than zero and the market is still crossed. If either of these conditions fails, then the matching process 62 is completed and executions are reported to processes internal and external to the securities processor 12.

During operations of the securities processor 10, the order book 14 is exclusively accessible by the matching process 62, which serves as an interface and the single point of access to the order book. By restricting access of the order book 14 to the matching process 62, other processes included in or related to the securities processor 12 do not interfere with operations of the order book 14. For example, in some computerized trading systems an order book may, for example, be scanned to provide securities information to users during the same time period in which orders are retrieved from the order book for matching to a received order. Interruptions, such as this, for allowing access and sharing of the order book between the matching process 62 and other lower priority processes slows the matching process and reduces trading efficiency. Also, by restricting access to the order book 14, security information throughput significantly increases. Thus, by isolating the order book 14 to interact exclusively with the matching process 62, matching speed and efficiency increases.

Besides receiving and processing an order, other activities related to the security or securities assigned to the securities processor 12 may be received. For example, a quote update may be received by the securities processor 12 and pulled from the matching trigger 60 by the matching process 62 for adding the quote in the order book 14 or preparing the quote for matching. If the received quote does not lock or cross the market, the order book 14 is updated by replacing an existing quote or adding the received quote as an initial quote. In another example, a two-sided quote may be received by the security processor 12 and pulled from the matching trigger 60 by the matching process 62. The side of the quote that does not lock or cross the market may update an existing quote or may add the quote as an initially received quote in the order book 14. The quote side that locks or crosses the inside is matched by the matching process 62 and any remainder will be added to the order book 14. Also, the marketable side of a received quote is removed from the order book 14 and replaced by any remainder after matching. A received quote may also include a relative update (e.g., a size increment or a size decrement) in which the matching process 62 adjusts the existing quote in the order book 14 for the relative size changes.

Supervisory commands (e.g., closing positions for a specific market participant, blocking a market participant's positions from being opened during the market opening process, purging a market participant's orders, or other similar commands) may also be received by the securities processor 12 and pulled from the matching trigger 60 by the matching process 62 for execution. However, supervisory command activities are complete, inclusive, and are implemented as modular plug-in components.

After matching, for example, the received order, or a portion of a received order, against one or more orders in the order book 14 and prior to pulling the next activity from the matching trigger 60, the order management process 64 reports the matching of the received order, or a portion of the received order, to an order activity log file 22 located in the server storage 56. Besides reporting the execution of the received order or a portion of the received order, the order management process 64 may report other activities, such as, executing a delivery order, executing an odd-lot order, adding a quote, canceling an order, canceling/replacing an order, purging an order, updating the order book 14 to reflect executions or adding an unmatched received order or a portion of the received order, or other similar activities associated to the securities processor 12. Also, in some implementations the order activity log file 22 may, for example, be a data file, a database, or other data storage structure that resides in server storage 56. Once stored in the order activity log file 22, the activities may be disseminated, for example, to trade participants, an Automated Confirmation Transaction (ACT) system, other interested parties, or other processes internal or external to the securities processor 12.

In particular, one process associated with the securities processor 12, which accesses the activities stored in the order activity log file 22 is an order file builder process 70. The order file builder process 70 constructs an order file 72 that provides near real-time disaster recovery of the order book 14 for a number of potential failure scenarios, as well as the contingent redeployment of activity processing to secondary securities processors (not shown). Each potential failure point in the trading system is supported by a level of redundancy, ranging from immediate system-level backup to delayed manual takeover. In the interest of rapid recovery for virtually all failures, a degree of automatic processing is allowed, but in general manual intervention is always an option. At lower failure levels, for example the failure of the securities processor 12, the securities processor is attempted to be restarted. As failure severity increases, such as the loss of the CPU 40 (shown in FIG. 1), the level of automation employed decreases. Ultimately, the most serious catastrophic failure, such as a loss of the entire server 10, may permit little automatic recovery.

To provide disaster recovery, the order file builder process 70 builds and maintains the order file 72 by retrieving the activities stored in the order activity log file 22. In some implementations, the order file 72 is stored on the server storage 56 and has the latest updates for open orders or orders with a special status (e.g., the market participant requests closing their positions due to equipment trouble, a display and reserve quantity are zero but the delivery quantity is greater that zero, etc.). While the order file builder process 70 stores activities related to updating the order book 14, activities irrelevant for reconstructing the order book 14, such as executed or canceling orders, are filtered from the material stored in the order file 72. By storing these activities, the order file 72 provides the current status of the security interests residing in the order book 14 to provide fast recovery in the event of a malfunction of the securities processor 12 or reassigning one or more securities to another security processor.

As mentioned, since the order book 14 resides in random access memory 16 such as main memory and in some implementations is accessed only by the matching process. In main memory information may be quickly stored on the order book as compared, for example, to order books residing in a magnetic medium (e.g., diskette, hard disk, etc.) which typically have much longer access times for storing and retrieving orders. Due to the fast accessibility of the random access memory 16, the order book 14 may also be quickly rebuilt by retrieving information stored in the order file 72, as compared to rebuilding order books stored on a slower access hard disk or other magnetic medium.

Figure 3:
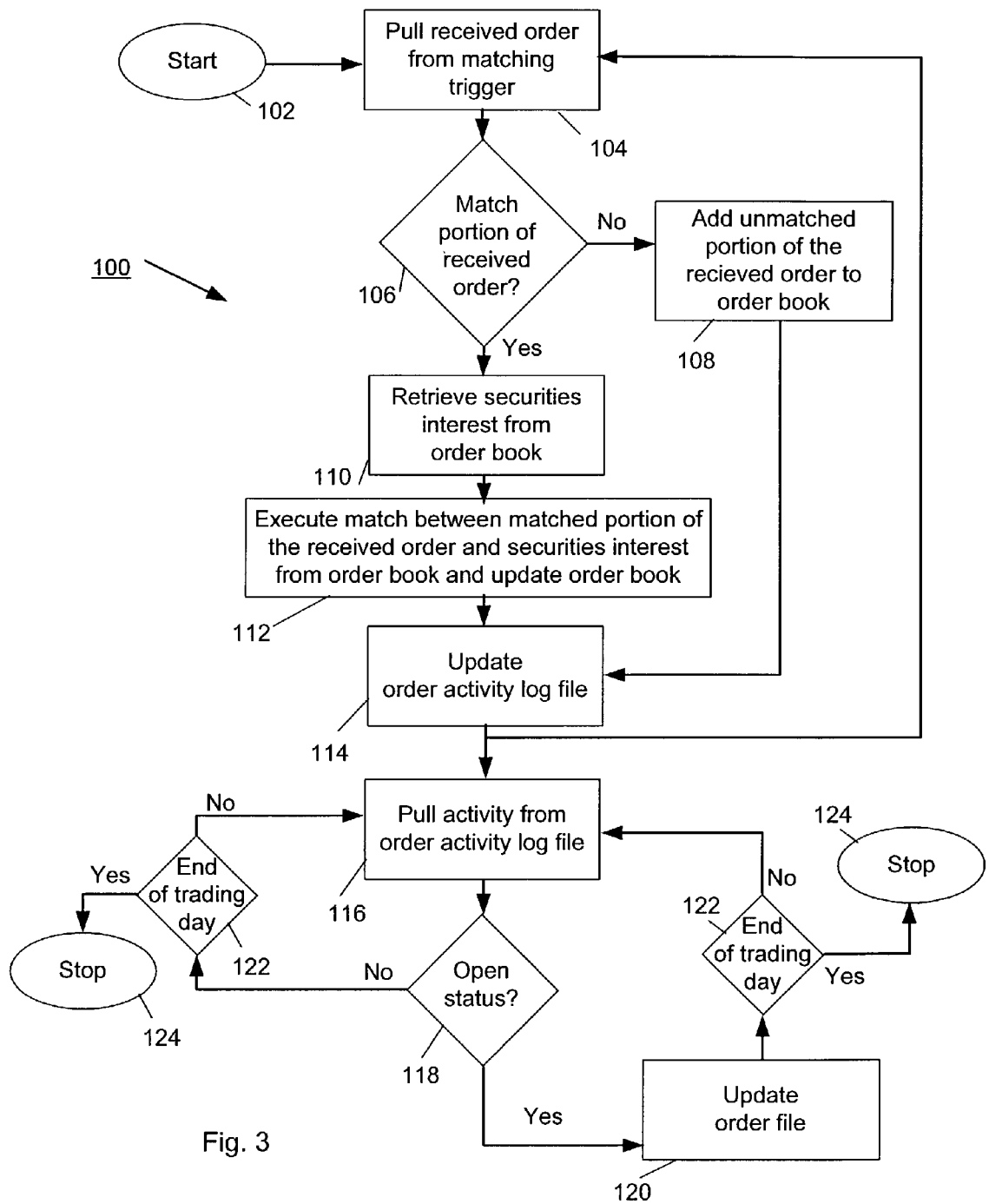
FIG. 3 is a flow chart for using a random access memory resident order book.

Referring to FIG. 3, a procedure 100 for using an order book residing in random access memory is shown. The procedure 100 starts 102 by pulling 104, for example, a particular security order from the matching trigger 60 (shown in FIG. 2) included in the securities processor 12 that is assigned to the security and determining 106 if a portion of the received order may be matched. If the procedure 100 determines 106 that a portion of the received order can be matched, the procedure 100 retrieves 110 a security trading interest on the opposite side of the market from the order book 14 (also shown in FIG. 2) in the random access memory 16 (also shown in FIG. 2). After retrieving 110 the security interest from the order book 14, the procedure 100 executes 112 the match between the portion of the received order and the retrieved security interest from the order book and updates the order book to reflect the match. If the procedure 100 determines 106 that a portion of received order can not be matched to any security interest residing on the order book 14, the procedure 100 adds 108 the portion of the received order to the order book for potential matching with orders received in the future. The order book 14 in memory is emptied at the end of each trading day, so orders received at the start of the next trading day are often added to the order book.

After executing 112 a portion of the received order or adding 108 a portion of the received order to the order book 14, the procedure 100 updates 114 the order activity log file 22 (also shown in FIG. 2) with an activity report relating to the received order. After updating 114 the order activity log file 22, the procedure 100 returns to pull 104 the next received order, or other activity, from the matching trigger 60. Also after updating 114 the order activity log file 22, the procedure 100 pulls 116 the newly entered activity report from the order activity log file 22 while concurrently returning to pull 104 the next received order. After pulling 116 the newly entered activity report from the order activity log file 22, the procedure 100 determines 118 if the security interest corresponding to the activity report has an open status. If the status is open, the order file 72 (also shown in FIG. 2) is updated 120 with the activity and the procedure 100 determines 122 if the trading day has ended. If the trading day has ended, the procedure 100 stops 124, but if the trading day has not ended, the procedure 100 returns to pulling 116 the next received order, or other activity, entered into order activity log file 22. However, if the status of the interest is not open, the order file 72 is not updated since an interest with, for example, a closed status is not relevant to rebuilding the order book 14 and the procedure 100 determines 122 if the trading day has ended. Again, if the trading day has ended, the procedure stops 124, however, if the trading day has not ended, the procedure 100 returns to pull 116 the next activity report entered into the order activity log 22.

Although some implementations have been described, other implementations are also within the scope of the following claims.

The order book described herein is not limited to the software embodiment described above; it may find applicability in any computing or processing environment. The order book may be implemented in hardware, software, or a combination of the two. For example, the order book may be implemented using circuitry, such as one or more of programmable logic (e.g., an ASIC), logic gates, a processor, and a memory.

The order book may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the order book. The order book may also be implemented as a machine-readable storage medium, configured with a computer program, where, upon execution, instructions in the computer program cause a machine to operate to perform the functions of the order book described above.

Embodiments of the order book may be used in a variety of applications. Although the order book is not limited in this respect, the order book may be implemented with memory devices in microcontrollers, general purpose microprocessors, digital signal processors (DSPs), reduced instruction-set computing (RISC), and complex instruction-set computing (CISC), among other electronic components.

Embodiments of the order book may also be implemented using integrated circuit blocks referred to as core memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A computer system for execution of transactions involving execution of orders for securities, the computer system comprises:
   a central processor device;
   a sequential access storage device that provides a persistent store of recorded information;
   a main memory coupled to the central processor and the main memory storing:
      an order book that includes orders and/or quotes for a particular security, the orders and/or quotes having various prices, sizes and time priorities;
      executable code that causes the processor device to match the orders and/or quotes in the order book for the security to a received order for the security, with the order book only accessible by the executable code that matches orders and/or quotes; and
   the executable code that matches further comprising:
      order management executable code that sends a message to report matching of the received order, or a portion of the received order, to orders and/or quotes in the order book to an order activity log file located in the sequential access storage device.

2. The system of claim 1 wherein the main memory is random access memory.

3. The system of claim 1 wherein the order management executable code further comprises instructions to:
   store messages reporting activities related to updating of the order book in the order activity log file; and
   filter messages related to activities irrelevant for reconstructing of the order book so as to not store the filtered messages in the order activity log file with the filtered messages including messages involving matched or canceled orders to provide in the order activity file a current status of the security interests residing in the order book permitting fast recovery in the event of a malfunction of the computer system or reassigning of one or more securities to another computer system.

4. The system of claim 1 further comprising executable code stored in the memory that manages the received order until the received order is sent to the executable code that matches the received order to orders/quotes in the order book.

5. The system of claim 1 wherein the order book resides in a first execution space of the main memory that includes the executable code to match orders and/or quotes.

6. The system of claim 1 wherein the order book resides in a first execution space of the main memory separate from a second execution space which includes the executable code to match orders and/or quotes.

7. The system of claim 1 wherein the order book has quotes and/or orders of a single security.

8. The system of claim 1 wherein the order book has quotes and/or orders of at least two securities.

9. The system of claim 1 wherein the received order is added to the order book if the received order is not immediately matched.

10. The system of claim 1 wherein the received order is added to the order book if the received order is not immediately canceled and not immediately matched.

11. A computer implemented method for trading securities in an electronic trading venue, the method comprising:
   storing by one or more computers an order book representing trading interest comprising orders and/or quotes of at least one security in a main memory of at least one of the one or more computer systems, with the computer systems further comprising a persistent sequential access storage device; and
   matching, using the at least one computer system, a portion of the security trading interest in the order book stored in the main memory to a received order for the security represented in the order book, with the order book only accessible during matching by executable code that causes the matching of the orders and/or quotes; and
   sending by the computer performing the matching, a message to report the matching of the received order, or a portion of the received order, to the orders and/or quotes in the order book, to an order activity log file located in the persistent sequential access storage device.

12. The method of claim 11 wherein the main memory is random access memory.

13. The method of claim 11 further comprises:
   storing messages reporting activities related to updating of the order book in the order activity log file; and
   filtering by the computer messages for activities irrelevant for reconstructing of the order book so as to not store the filtered messages in the order activity log file, with the filtered messages including messages involving matched or canceled orders to provide a current status of the security interests residing in the order book and provide fast recovery in the event of a malfunction of system or reassigning of one or more securities to another system.

14. The method of claim 11 further comprising
   managing the received order until the received order is sent to the executable code that matches the received order to orders/quotes in the order book.

15. The method of claim 11 wherein the order book resides in a first execution space of the main memory that includes the computer instructions to match orders and/or quotes.

16. The method of claim 11 wherein the order book resides in a first execution space of the main memory separate from a second execution space that includes the computer instructions to match orders and/or quotes.

17. The method of claim 11 wherein the order book has interest of a single security.

18. The method of claim 11 wherein the order book has interest of at least two securities.

19. The method of claim 11 wherein the received order is added to the order book if the received order is not immediately executed.

20. The method of claim 19 wherein the received order, that was not executed, is added to the order book if the received order that was not executed is not immediately canceled.

21. A computer program product residing on a computer readable medium for trading securities in an electronic trading venue, the computer program product comprises instructions to cause a computer to:

store an order book representing trading interest of at least one security in a main memory of a computer system;

match a portion of the security trading interest in the order book stored in the main memory to a received order for a security represented in the order book with the order book only accessible during a match by the instructions that match orders and/or quotes; and send a message to report the match of the received order or a portion of the received order to the orders and/or quotes in the order book to an order activity log file located in a persistent sequential access storage device associated with the computer.

22. The computer program of claim 21 wherein the main memory is random access memory.

23. The computer program of claim 21 further comprises instructions to:

store messages reporting activities related to updating of the order book in the order activity log file; and filter messages related to activities irrelevant for reconstructing of the order book so as to not store the filtered messages in the order activity log file with the filtered messages including messages involving matched or canceled orders to provide in the order activity file a current status of the security interests residing in the order book permitting fast recovery in the event of a malfunction of the computer system or reassigning of one or more securities to another computer system.

24. The computer program of claim 21 further comprising instructions to:

manage the received order until the received order is sent to the executable code that matches the received order to orders/quotes in the order book.

25. The computer program of claim 21 wherein the order book resides in a first execution space of the main memory that includes the instructions to match.

26. The computer program of claim 21 wherein the order book resides in a first execution space of the main memory separate from a second execution space which includes the instructions to match.

27. The computer program of claim 21 wherein the order book has interest of a single security.

28. The computer program of claim 21 wherein the order book has interest of at least two securities.

29. The computer program of claim 21 wherein the received order is added to the order book if the received order is not immediately executed.

30. The computer program of claim 21 wherein the received order is added to the order book if the received order is not immediately canceled.

31. A system comprises:

a processor;

a main memory storing an order book that includes orders and/or quotes for at least one security, the orders and/or quotes having various prices, sizes and time priorities;

a sequential access storage device that provides a persistent store of recorded information;

computer instructions stored in the main memory, comprising instructions to:

match a portion of security interest in the order book to a received order for a security, the order book in a first execution space of the main memory, which includes the computer instructions that match, with order book only accessible by the computer instructions that match; and send a message to report matching of the received order or a portion of the received order to orders and/or quotes in the order book to an order activity log file located in the sequential access storage device;

store messages reporting activities related to updating of the order book in the order activity log file; and filter messages related to activities irrelevant for reconstructing of the order book so as to not store the filtered messages in the order activity log file with the filtered messages including messages involving matched or canceled orders to provide in the order activity file a current status of the security interests residing in the order book permitting fast recovery in the event of a malfunction of the computer system or reassigning of one or more securities to another computer system.

32. The system of claim 31 wherein the main memory is random access memory.

* * * * *